US007644036B2

(12) United States Patent
McCoy et al.

(10) Patent No.: US 7,644,036 B2
(45) Date of Patent: *Jan. 5, 2010

(54) CREDIT CARD SUPPORTED ELECTRONIC PAYMENTS

(75) Inventors: Randal A. McCoy, Suwanee, CA (US);
Peter J. Kight, Alpharetta, GA (US);
David E. Torgerson, Alpharetta, GA (US); Casey W. Kozee, Lawrenceville, GA (US)

(73) Assignee: Checkfree Corporation, Norcross, GA (US)

( * ) Notice: Subject to any disclaimer, the term of this patent is extended or adjusted under 35 U.S.C. 154(b) by 575 days.

This patent is subject to a terminal disclaimer.

(21) Appl. No.: 11/479,393

(22) Filed: Jun. 30, 2006

(65) Prior Publication Data
US 2006/0277147 A1   Dec. 7, 2006

Related U.S. Application Data

(63) Continuation of application No. 11/118,469, filed on May 2, 2005, now abandoned, which is a continuation of application No. 10/608,419, filed on Jun. 30, 2003, now Pat. No. 6,932,268.

(51) Int. Cl.
*G06Q 40/00* (2006.01)
(52) U.S. Cl. ................... 705/39; 235/379; 235/380; 705/35; 705/37; 705/38; 705/40
(58) Field of Classification Search ............. 705/35–45; 235/379, 380
See application file for complete search history.

(56) References Cited

U.S. PATENT DOCUMENTS 4,823,264 A   4/1989   Deming 5,025,373 A   6/1991   Keyser, Jr. et al.
5,220,501 A   6/1993   Lawlor et al.
5,283,829 A   2/1994   Anderson
5,326,959 A   7/1994   Perazza (Continued)

FOREIGN PATENT DOCUMENTS

WO   WO 95/22113   *   8/1995

OTHER PUBLICATIONS

Kang, Cecilia. America Online Make Deal for Bill-Payment Services, San Jose Mercury News, Nov. 24, 1999.*

(Continued)

*Primary Examiner*—Charles R Kyle
*Assistant Examiner*—Robert R Niquette
(74) *Attorney, Agent, or Firm*—Sutherland Asbill & Brennan LLP

(57) ABSTRACT

A payment service provider receives a request to pay a payee on behalf of a payor and determines, responsive to the received request, that the payee will not accept the requested payment via a charge to a credit card account of the payor with a credit card issuer. The payor wishes to fund the requested payment from the credit card account. Accordingly, the payment service provider transmits, to the credit card issuer, account information identifying the credit card account and payment information representing the requested payment for inclusion in a credit card statement of the credit card issuer to the payor for the credit card account. However, the payment service provider directs the requested payment to the payee on behalf of the payor from a payment account other than the credit card account.

22 Claims, 4 Drawing Sheets

U.S. PATENT DOCUMENTS

| | | | |
|---|---|---|---|
| 5,336,870 A | 8/1994 | Hughes et al. | |
| 5,383,113 A | 1/1995 | Kight et al. | |
| 5,420,405 A | 5/1995 | Chasek | |
| 5,465,206 A | 11/1995 | Hilt et al. | |
| 5,504,677 A | 4/1996 | Pollin | |
| 5,671,279 A | 9/1997 | Elgamal | |
| 5,677,955 A | 10/1997 | Doggett et al. | |
| 5,699,528 A | 12/1997 | Hogan | |
| 5,710,889 A | 1/1998 | Clark et al. | |
| 5,727,249 A | 3/1998 | Pollin | |
| 5,794,221 A | 8/1998 | Egendorf | |
| 5,873,072 A | 2/1999 | Kight et al. | |
| 5,884,288 A | 3/1999 | Chang et al. | |
| 5,920,847 A | 7/1999 | Kolling et al. | |
| 5,920,848 A | 7/1999 | Schutzer et al. | |
| 5,966,698 A | 10/1999 | Pollin | |
| 5,974,146 A | 10/1999 | Randle et al. | |
| 5,978,780 A | 11/1999 | Watson | |
| 6,029,150 A | 2/2000 | Kravitz | |
| 6,032,133 A | 2/2000 | Hilt et al. | |
| 6,098,053 A | 8/2000 | Slater | |
| 6,188,994 B1 | 2/2001 | Egendorf | |
| 6,208,978 B1 * | 3/2001 | Walker et al. | 705/38 |
| 6,311,170 B1 | 10/2001 | Embrey | |
| 6,327,574 B1 | 12/2001 | Kramer et al. | |
| 6,332,133 B1 | 12/2001 | Takayama | |
| 6,386,444 B1 | 5/2002 | Sullivan | |
| 6,601,761 B1 * | 8/2003 | Katis | 235/379 |
| 6,611,818 B1 | 8/2003 | Mersky et al. | |
| 6,662,166 B2 | 12/2003 | Pare et al. | |
| 6,663,002 B2 | 12/2003 | Glaser | |
| 6,932,268 B1 * | 8/2005 | McCoy et al. | 235/380 |
| 2001/0037295 A1 | 11/2001 | Olsen | |
| 2003/0061146 A1 * | 3/2003 | Thompson | 705/37 |
| 2003/0216996 A1 * | 11/2003 | Cummings et al. | 705/39 |
| 2004/0030647 A1 | 2/2004 | Hansen et al. | |
| 2004/0088237 A1 * | 5/2004 | Moenickheim et al. | 705/35 |
| 2004/0133509 A1 | 7/2004 | McCoy et al. | |
| 2005/0192901 A1 * | 9/2005 | McCoy et al. | 705/40 |
| 2006/0277147 A1 * | 12/2006 | McCoy et al. | 705/40 |

OTHER PUBLICATIONS

Disclosure Under 37 C.F.R. 1.56.

* cited by examiner

CREDIT CARD SUPPORTED ELECTRONIC PAYMENTS

CROSS REFERENCE TO RELATED APPLICATIONS

The present application is a continuation of U.S. application Ser. No. 11/118,469, filed May 2, 2005 now abandoned, entitled "Credit Card Supported Electronic Payment," which is a continuation of U.S. application Ser. No. 10/608,419, filed Jun. 30, 2003, entitled "Dual Mode Credit Card Based Payment Technique" (now U.S. Pat. No. 6,932,268), and both disclosures are incorporated by reference herein in their entirety.

FIELD OF THE INVENTION

The present invention relates to electronic commerce, and more particularly to an electronic payment service in which payments to any payee can be credit card based, regardless of whether the payee accepts credit card payments.

BACKGROUND OF THE INVENTION

An electronic payment service provider is an entity that provides the electronic commerce service of completing payment on behalf of a user of the electronic payment service of that service provider. The user on whose behalf a payment is completed is a payor, and an entity receiving the payment is a payee. An enrolled user of a service provider is known as a subscriber of the service provider. A subscriber can be an individual, a business, or another type of organization.

A payee is often a biller. A biller is an entity that renders a service, or provides goods, to a customer on a credit basis, then, either simultaneously or subsequently, prepares and delivers a bill to request payment from the customer. Delivery of a bill can be completed by either traditional paper-based delivery, typically via a postal service, or electronic bill presentment. A payee can also be an entity that does not issue bills.

A service provider receives a payment request electronically, either directly from subscriber, or from another entity acting on behalf of a subscriber. A payment request, at a minimum, specifies a payor (possibility indirectly), a payee (possibly by reference), and a payment amount. A payment date is also typically included, although it can be assumed to be "as soon as possible" if omitted. A payment request may be originated at any one of several electronic user interfaces, including automated telephone system interfaces, Web-based interfaces, PC application-based interfaces, PDA-based interfaces, television/set-top box-based interfaces, and mobile phone-based interfaces.

After receipt of a payment request, a service provider processes the request to complete the payment. At the conclusion of payment processing the service provider issues remittance to a payee. Remittance is a combination of a credit to a payee and remittance advice associated with the credit.

A credit accomplishes a transfer of funds to a payee to fulfill a payment request. A credit may be performed through a paper process (check or draft), or an electronic funds transfer (EFT) process. In conventional electronic payment service techniques the funds may come directly from a demand deposit account (DDA) associated with a subscriber, or from a DDA associated with the payment service provider. As will be discussed further below, in some electronic payment service techniques funds come from a credit card issuer having issued a credit card to the payor. A DDA could be a checking account, a money market account, or any other type account 'from which an account holder can, at will, issue an order that funds held therein be withdrawn for credit elsewhere. An electronic funds transfer is the process of causing funds to move between accounts at different financial institutions across one or more networks. A financial institution is an entity that maintains financial accounts that can be debited and/or credited as a result of transaction activity. Financial institutions include banks, savings and loans, credit unions, and brokerage houses. Networks linking financial institutions include the Federal Reserve's Automated Clearinghouse (ACH) network.

The Federal Reserve System is the central bank of the United States of America, formed by an act of Congress. It consists of twelve Reserve Banks located in major cities throughout the United States. The ACH network electronically links the Federal Reserve Banks with financial institutions throughout the United States to support electronic funds transfer between the financial institutions. CheckFree's Direct Send network, MasterCard's RPPS network, Visa's ePay network, and Princeton eCom's network are examples of remittance networks, each of which links a service provider with one or more payees.

Remittance advice is a description of a credit that allows proper payment posting to a specific account, or sub-account, in a payee's Accounts Receivable ledger. Remittance advice may be tightly coupled with an instrument used to accomplish the credit (e.g., information printed in a memo field on a check or draft, or information included in a field in an electronic funds transfer file transmitted over a network linking financial institutions), or it may be somewhat decoupled from the credit, such as a paper document delivered to a payee, separate from a credit, or an electronic file transmitted directly to the payee separate from a credit. Remittance advice typically includes at least information identifying a payor, information identifying the payor's account with the payee, and a payment account.

A managed payee is a payee about whom a service provider has information that enables remittance to that payee to be handled in some improved/optimal fashion. The information typically includes one or more of account schemes for improved reliability of Accounts Receivable posting at the managed payee, account ranges for remittance center identification, other information for remittance center identification, payee preferred credit form (paper or electronic), payee preferred remittance advice form (paper or electronic, and format/syntax), and electronic communication parameters for delivery of electronic credits and/or electronic remittance advice.

Managed payee information, collected by a service provider from managed payees and/or other sources, is typically stored in a managed payee database. A managed payee database includes information identifying each managed payee known to a service provider, along with the information collected about each managed payee.

An unmanaged payee is a payee about whom a service provider does not maintain information which aids in the handling of remittance. An electronic payee is a managed payee that can receive remittance electronically. A merchant is a payee that issues bills for services rendered or goods purchased. Thus, a merchant is a special class of payee, a payee that issues bills. A merchant can be an unmanaged merchant or a managed merchant. If a merchant is a managed merchant, it can further be an electronic merchant.

For many service providers, payment processing dictates the form of remittance issued, i.e. electronic or paper. Some service providers use payment processing to determine a form of remittance based solely upon a status of a payee as a managed payee, with remittance issued in accordance with a managed payee's wishes. Thus, during payment processing, such a service provider determines if a payee identified in a payment request is a managed payee (or managed merchant). If so, information stored in a managed payee database is retrieved and remittance is issued in accordance with the stored information. If the retrieved information indicates that remittance should be issued electronically, the remittance is issued accordingly. And, if the retrieved information indicates that remittance should be issued on paper (check or draft), the remittance is likewise issued accordingly.

If a payee is not determined to be a managed payee, remittance will typically be issued on paper. Alternatively, an unmanaged payee is invited to join the "managed payee community", and the payment is held until joining. If an unmanaged payee does not join in a certain timeframe, the payment is either issued on paper, or the payment is cancelled. When payment is issued by check to an unmanaged payee some service providers automatically issue a check drawn on a DDA associated with the payment service provider, typically known as a corporate check, as the form of remittance. Still other payment service providers perform risk processing to determine whether paper remittance will be a corporate check, or a draft drawn on a DDA of a payor. A draft is a special class of check, one prepared by an entity other than an account holder of the account upon which the draft is drawn.

In risk processing, a payment request is evaluated against a set of rules that determines whether the credit can be issued "at risk" to the electronic payment service provider. An "at risk" credit is a credit from an account belonging to a service provider. Risk processing is only performed in those instances where a service provider is not assured of receiving funds in at least an amount of a payment made on behalf of a payor. If a determination is made that a payment will not be issued "at risk", payment is made by a draft drawn on a payor's DDA prepared by a service provider. This could happen even if payment processing determined that the payment could have been issued electronically.

A service provider can be assured of receiving funds in a "good funds" model of payment processing. In a good funds model an electronic payment service provider performs a debit authorization against a payor's DDA before issuance of a credit. That is, an electronic payment service provider first ensures that funds from a payor's account are available before a credit is issued on behalf of that payor.

A service provider can also be assured of receiving funds in a "guaranteed funds" model of payment processing. In a guaranteed funds model an entity other than a service provider commits to reimburse the service provider for any credits issued for which an associated debiting of a payor's DDA fails. The guaranteeing entity is typically the payee, although it may be another entity such as a consumer service provider, to be discussed further below, or a financial institution at which the payor's DDA is maintained. Typically, funds are guaranteed up to some limit. For payments beyond that limit, the service provider must perform good funds processing or risk processing.

For other service providers a status of a payee as a managed payee is but one factor considered in payment processing to determine a form of remittance. Some service providers perform risk processing to determine if an "at risk" credit will be issued, which could cause remittance to be issued on paper (draft) even if the payee is an electronic payee.

Other service providers, potentially the same ones that also use the results of risk processing as a factor, first determine if a payee is an electronic payee, but then use the results of account scheming (a process of verifying and/or altering a supplied account number in accordance with an account number pattern, or "scheme") to determine a form of payment. Additionally, other criteria may be used in determining a form of payment, by these or by other service providers.

Typically, a service provider has five mechanisms to complete payment to a payee on behalf of a payor. Selection of a mechanism to complete payment is often made during payment processing. The first is ACH-ACH payment, which is all electronic, in which a service provider transmits both the credit portion and the remittance advice portion of remittance via the ACH network for delivery. The second is ACH-Direct Send payment, which is also all electronic, in which a service provider transmits the credit portion via the ACH network, and transmits the remittance advice portion directly to a payee via a network different than the ACH. Alternatively, in some ACH-Direct Send payments, remittance advice is delivered to a payee in hard copy. The third is Third Party payment, which is also all electronic, in which a service provider transmits both the credit portion and the remittance advice portion via a third party remittance network for delivery. The fourth is Corporate Check payment, which is paper, in which a service provider delivers a check to a payee, the check being drawn on a DDA belonging to the service provider. Remittance advice is printed upon, or associated with, the corporate check. The fifth is Draft payment, which also is paper, in which a service provider delivers a draft to a payee, the draft being drawn on a DDA belonging to a payee and having printed remittance advice printed thereon, or associated therewith.

An electronic biller is a biller that presents at least a subset of its bills, for at least a subset of its customers, electronically, either directly or through a biller service provider (BSP). A BSP is an entity that facilitates at least some aspect of electronic bill presentment on behalf of the electronic biller. A BSP can also be an electronic payment service provider. Such service providers are known as electronic billing and payment (EBP) service providers. Electronic bill presentment can be via any one of several electronic user interfaces, including Web-based interfaces, PC application-based interfaces, PDA-based interfaces, mobile phone-based interfaces, and television/set-top box-based interfaces.

Some service providers only make payments to a finite set of managed payees with whom they have an established relationship. These managed payees may or may not be electronic billers. Such payment service providers are said to offer a "closed" electronic payment service.

Still other service providers make payments to any payee, as long as the service provider knows the payee's name and address, typically obtained from a payor. Such service providers are said to offer an "open", or "pay anyone", electronic payment service. Typically, a payment to a payee that is not an electronic payee has to be a paper (check or draft) payment. Alternatively, the service provider may extend an invitation to the non-electronic payee to join its community of electronic managed payees, holding payment until either the payee joins (after which the payment is released electronically) or a time period passes (after which the payment is released in paper form, or abandoned, or returned).

The services offered by electronic payment service providers and EBP service providers have become widely accepted. Millions of bills are electronically presented to subscribers each month, and millions of payments are completed on behalf of subscribers each month. Many subscribers pay all of their bills utilizing an electronic payment service provider or an EBP service provider. Thus, a service provider has become a central point of bill payment activity for these subscribers.

The electronic commerce service of on-line retail purchase has also become widely accepted. In on-line retail purchase a merchant presents goods for sale via an interactive Web site. A customer selects, via the interactive Web site, goods for purchase. The interactive Web site typically includes a payment presentation for the customer to provide payment information. Payment for goods purchased on-line is primarily by credit card, though other payment mechanisms are sometimes available. These other payment mechanisms include Cash On Delivery and traditional billing.

In credit card payment for on-line retail purchases, the merchant maintains a relationship with a financial institution that is part of a credit card network and is also an acquirer. That is, the merchant is a customer of the acquirer and can thus accept credit card payment, the processing of which is handled through the acquirer. A payment presentation for credit card payments includes fields for a customer (the purchaser) to enter information associated with his or her credit card, including at least credit card number, and typically an expiration date and billing address. The merchant, after receiving this information via the payment presentation, forwards such, along with a purchase amount, to the credit card network for authorization and/or settlement. The credit card network propagates the payment request to the customer's credit card issuer. If the request is a settlement request, the credit card issuer debits the purchaser's credit card account. Upon successful authorization, the network credits the merchant's account via the acquirer, then the customer's credit card issuing financial institution and the merchant's acquiring financial institution settle between themselves. The debit is reflected in the purchaser's next credit card statement as a payment to the merchant, and the statement serves as a bill to collect payment from the purchaser.

Traditionally, billers did not accept credit card payment in payment of bills, typically because of credit card acceptance fees. However, with the widespread acceptance of electronic payment services and on-line retail purchases some billers now accept credit card payment through biller direct Web sites and telephone interfaces as a customer convenience. Much like online retail purchases, a credit card based payment of a bill is reflected in a payor's next credit card statement as a payment to the biller (the payor must still pay the credit card bill). Credit card issuers desire to increase the number of payments made via credit card, because of the associated fees collected by the issuers.

Accordingly, a need exists for a technique to increase the number of payments made via credit card.

Recently, some electronic payment service providers have begun to support limited payment by credit card. In one service provider technique of credit card based payment a service provider processes credit card based payments on behalf of billers. That is, a service provider does not offer the payment service to subscribers. Rather, the service provider merely provides a payment interface on behalf of a biller. Such a service provider sometimes supports multiple payment interfaces, including telephone-based and Web-based interfaces, each branded according to a single biller. According to this technique, a customer of a biller accesses a biller branded payment interface and provides credit card information that is utilized in payment of only that biller. In other words, this is not a pay anyone payment service.

In another service provider technique of credit card payment a service provider acts as a gateway to a credit card network. The biller is a customer of an acquirer. The service provider merely passes a payment request to the credit card network, which in turn processes the request and pays the biller. In this technique the service provider does not offer the payment service to subscribers. Rather, the service provider merely provides a payment interface on behalf of a biller. In this technique, a customer of a biller accesses a biller branded payment interface and provides credit card information that is utilized in payment of only that biller. In other words, this too is not a pay anyone payment service.

In yet another service provider technique of credit card payment a service provider processes credit card based payments to a wider range of payees, including billers and non-billers. In this technique, the service provider makes payments, including credit card based payments, on behalf of subscribers to only other subscribers. Thus, this technique too is not a pay anyone payment service. Utilizing either of these three techniques, payors have a limited number payees to which payment can be made by credit card.

Accordingly, a need exists for a technique to make credit card based payments to a greater number of payees, including billers and non-credit card accepting payees, or even any payee.

In the payment service techniques described above in which the biller is not a customer of an acquirer a service provider is a customer of an acquirer. Once a service provider receives credit card information from a payor, the service provider forwards this information, along with a payment amount, to a credit card network. As described above, the credit card network propagates the request to the payor's credit card issuer, which then debits the payor's credit card account. The credit card network also triggers a credit to the service provider via its acquirer. Note that the credit card issuer does not pay the intended payee. Rather, the service provider issues a credit to the intended payee, either by a corporate check, or an electronic funds transfer via the ACH network, drawn on a service provider DDA. The service provider acts as a master merchant, purchasing funds via credit cards and then distributing those funds through a DDA.

Credit card based payments made according to these techniques in which the service provider is a customer of an acquirer result in a transaction being reflected in a payor's next credit card statement as a payment to the service provider, not a payment to the intended payee. Many payors utilize credit card statements to track spending. Credit card based payments made in accordance with these two techniques cannot be utilized to precisely track spending because information identifying a service provider, not an intended payee, is contained in credit card statements.

Accordingly, a need exists for an electronic payment service technique in which a credit card based payment submitted through a service provider not acting as gateway is reflected in a credit card statement as a payment to a payee, not the service provider.

No service provider technique of credit card payment exists in which the advantages of a service provider acting as both a gateway to a credit card network and a master merchant are achieved. Such a technique would facilitate not only an increase in the number of credit card payments, but also a greater number of payees a payor would be able to pay by credit card.

Accordingly, a need exists for a dual mode electronic payment service technique in which the advantages of credit card gateway techniques and master merchant techniques are both achieved.

SUMMARY OF THE INVENTION

In accordance with the present invention, a method and system for directing a credit card based payment to a payee on behalf of a payor having a credit card issued by a credit card issuer. A credit card based payment is a payment which results in a charge to a payor's credit card. That is, the payor ultimately pays the credit card issuer in association with the payment to the payee. A credit card issuer is an entity, typically a financial institution, that extends a line of credit. The entity to which the line of credit is extended is a credit card holder. A payor can be any individual, business, or organization which makes payments and is a credit card holder. A payee can be any individual, business, or organization that receives payments. A payee, in accordance with the present invention, need not necessarily accept payments by credit card for a credit card based payment to be completed to that payee.

The system of the present invention includes one or more communications interfaces and one or more processors. Each communications interface is configured to receive and transmit information. Preferably, the information is received and transmitted via at least one network. information received by the communications interface is passed on to one of the set of processors, and the processor causes the communications interface to transmit information. The at least one network could be, but is not limited to, the Internet, a local area network, a wide area network, and the public switched telephone network, as well as any other network capable of transmitting information, including a wireless network. The set of processors can compromise any type of processor capable of functioning to implement the method as described herein, including, but not limited to, a processor as found in a typical personal computer, main-frame computer, server-type computer, or any other type of computing device.

In accordance with the present invention, a payment request to pay the payee on behalf of the payor is received by a payment service provider. A payment service provider is an entity that provides the service of paying a payee on behalf of a payor. That is, a payment service provider causes funds to be delivered to a payee, or an account associated with the payee, on behalf of a payor.

After receipt of the payment request, the payment service provider transmits information associated with the received payment request to the credit card issuer. This transmission is not made via a credit card network. A credit card network is a network operated by a credit card association for transmitting information associated with credit card based payments. Information transmitted via a credit card network includes credit requests and settlement information. The transmission to the credit card issuer from the payment service provider does not even need to be an electronic transmission; it could be a hard copy transmission, such as the mailing of a letter. If the transmission is an electronic transmission, it could be made via the Internet, via fax, via telephone, via e-mail, or via any other electronic means other than a credit card network.

The transmitted payment information identifies at least an amount of the requested payment and an account number of the payor's credit card. As desired, the transmitted payment information could include other information, but the transmission of other information is not required.

In response to the transmitted payment information the service provider receives funds from the credit card issuer. These funds are not received via a credit card network. Rather, the funds are received in another manner, which could include a check, or another manner of delivering funds via a paper payment instrument. Also, funds could be received via an electronic funds transfer, or in any other electronic manner other than via a credit card network.

The payment service provider delivers funds and remittance advice to the payee to complete the payment on behalf of the payor. The delivery of funds to the payee could be prior to, subsequent to, or essentially concurrent with the receipt of funds by the service provider from the credit card issuer. Remittance advice could be delivered with the funds, or separately. Also, the delivery of funds to the payee could be by a check, other paper means, or by an electronic funds transfer. If funds are delivered via an electronic funds transfer, funds are directed to a deposit account associated with the payee that is maintained at a financial institution. Thus, in the credit card based payment technique of the present invention, a payee receives funds from a payment service provider, not a credit card issuer, or any other entity participating in a credit card network.

In one aspect of the present invention, the transmitted payment information also includes information that identifies the payee. In such a case, even though the payment information transmitted to the credit card issuer includes information identifying the payee, the payee still receives funds from the payment service provider, not any entity participating in a credit card network.

In a further aspect of the invention, information associated with the payment to the payee, completed by the payment service provider, is included in a credit card statement issued by the credit card issuer for the payor. Beneficially, the payment is reflected as a payment to the payee, not the payment service provider, even though the credit card issuer issues funds to the payment service provider, not the payee.

In another aspect of the present invention, the payee is a first payee. The payment service provider receives another payment request for the payment service provider to direct a payment to a different payee on behalf of the payor. This different, second, payee accepts the payor credit card as a form of payment. The service provider recognizes that the second payee accepts the payor credit card and thus transmits payment information to a credit card network to complete the payment on behalf of the payor. Once the service provider transmits payment information to a credit card network, the payment service provider is no longer involved in delivering funds to the second payee. Thus, in this aspect of the present invention, the payment service provider operates in a dual mode. The payment service provider determines if a payee accepts a credit card; if so, one set of operations are performed to complete payment, and if not, another set of operations are performed to complete payment.

In a further aspect of the present invention, the service provider delivers to the second payee remittance advice associated with the payment. This delivery of remittance advice occurs even though the payment service provider does not deliver funds to the payee in this aspect of the present invention.

In yet another aspect of the present invention, the payment service provider transmits the payment information to the credit card issuer via the Internet. The payment information could be, as desired, secured for transmission, perhaps by encryption.

In still another aspect of the present invention, the funds directed to the payment service provider are received from the credit card issuer via the ACH network. The ACH network is a network operated by the Federal Reserve which links financial institutions.

In one aspect of the present invention, the service provider makes a determination as to if the received payment request includes information identifying the payor credit card or a deposit account associated with the payor. In this aspect, the payment information is transmitted to the credit card issuer, and the funds are received from the credit card issuer, only if it is determined that the received payment request includes information identifying the payor credit card. Thus, in this aspect also, the payment service provider operates in a dual mode. In this dual mode, the payment service provider can, dependent upon a payer's wishes, complete a credit card based payment or a deposit account based payment on behalf of the payor.

In a further aspect of the present invention, the payee is a first payee, the payment request is a first payment request, and the payment is a first payment. The payment service provider receives a second payment request to direct a second payment to a second payee on behalf of the payor. This second payment request includes information identifying the payor deposit account, not the payor credit card. The payment service provider, because the second payment request identifies the payor deposit account, completes the second payment to the second payee as a payor deposit account based payment, not a payor credit card based payment. It should be noted that the second payee could be the first payee. In such a manner, the payor can make, as desired, both credit card based payments and deposit account based payments to the same payee.

In another aspect of the present invention, the payor is associated with a consumer service provider. A consumer service provider is an entity that makes the service of issuing payments on behalf of a payor available to the payor, but itself may not perform the operations necessary to issue payments to payees. Also in this aspect, the payee could be the consumer service provider, or another entity. If the payee is a consumer service provider, the payment service provider makes the services of the payment service provider available to the payee so that the payee can direct a credit card based payment to the consumer service provider, and perhaps other entities, as desired by the consumer service provider. The consumer service provider need not even accept credit card based payments in this aspect.

In still another, especially beneficial aspect, of the present invention, the payee does not accept credit cards as a form of payment. Thus, the payor is able, because of the operations of the payment service provider, to make a credit card based payment to a payee that does not accept credit cards. It should be noted that the payee does not have to be aware the payment it receives from the payment service provider on behalf of the payee is a credit card based payment.

In yet another aspect of the present invention, the payment service provider transmits a request to the credit card issuer for a credit card payment authorization. The transmission of the credit card payment authorization is not made via a credit card network. The payment service provider receives an approval response from the credit card issuer, also not via a credit card network.

The authorization request could be transmitted either prior to, or with, the payment information. If it is transmitted prior to the transmission of the payment information, preferably the authorization response is received prior to the transmission of the payment information. If the authorization request is transmitted with the payment information, the authorization request is received prior to the payment service provider directing funds to the payee.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
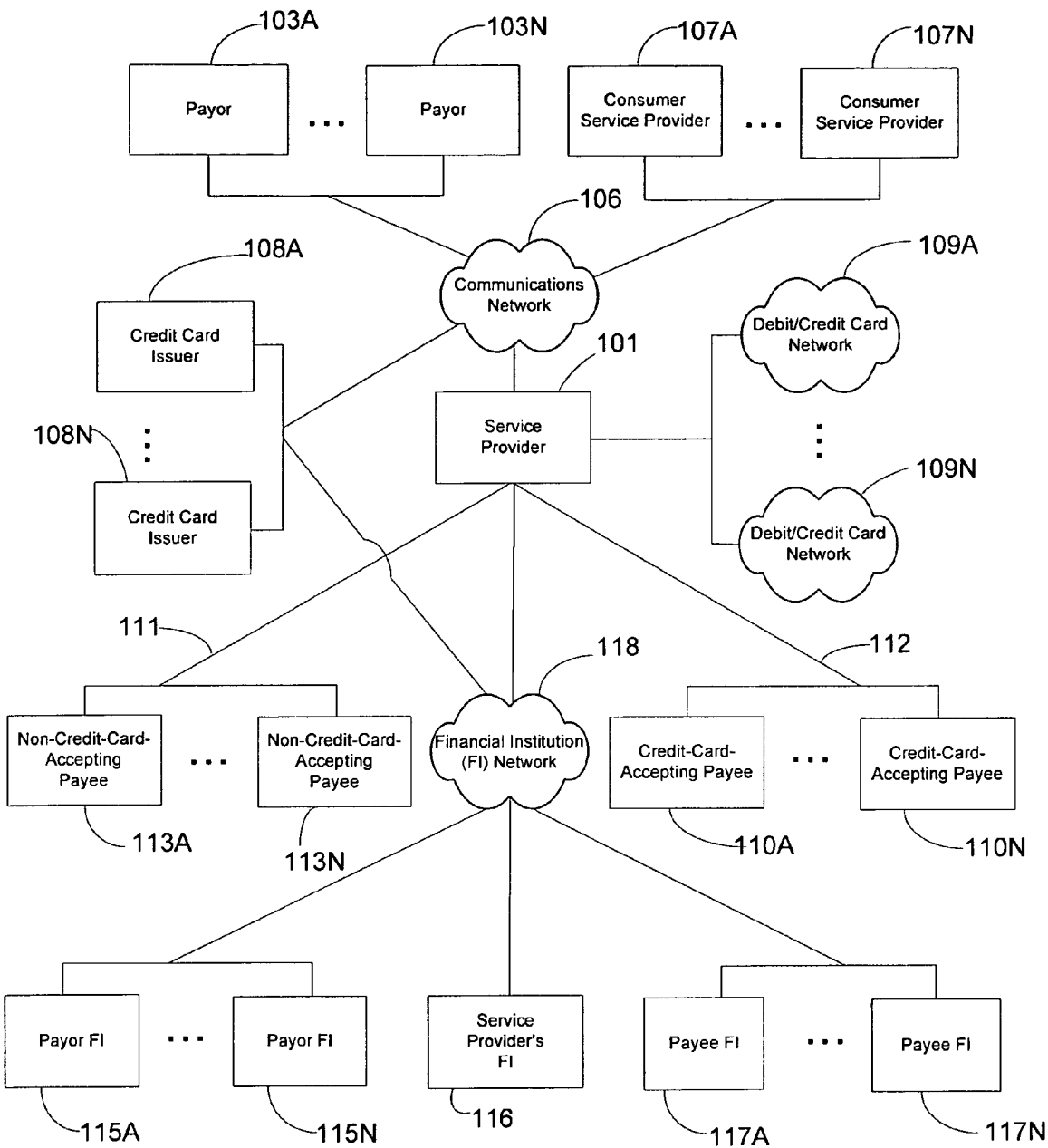
FIG. 1 is a simplified depiction of various entities participating in an electronic payment service in accordance with the present invention.

FIG. 1 depicts a service provider 101 of at least an electronic payment service. The service provider 101 could, as desired, also provide an electronic bill presentment service, as well as other electronic commerce services. Thus, the service provider 101 is at least an electronic payment service provider, and could, as desired, be an electronic billing and payment service provider.

The service provider 101 provides the payment service to one or more payors 103A-103N. Payors 103A-103N communicate with the service provider 101 via a communications network 106. The communications network 106 preferably is the Internet, though it could be another public network, or even a private network. Further, the communications network 106 could be multiple linked networks.

A payor 103A-103N, in some instances, communicates directly with the service provider 101. In other instances, a payor 103A-103N communicates with the service provider 101 through one of consumer service providers 107A-107N.

A consumer service provider 107A-107N is an entity that offers a payment service to certain ones of payors 103A-103N, while the service provider 101 provides the functionality, i.e., payment processing and remittance issuance, of completing payments. A consumer service provider 107A-107N may, as desired, present a payment service user interface to a payor 103A-103N to provide information to, and receive information from, a payor 103A-103N. In such instances, such a consumer service provider 107A-107N receives information from the service provider 101, via the communications network 106, and then presents such to a payor 103A-103N. Likewise in such instances, a consumer service provider 107A-107N receives information from a payor 103A-103N, and then passes such to the service provider 101 via the communications network 106. Communications between a payor 103A-103N and a consumer service provider 107A-107N can, as desired, be via the communications network 106, via another network, or otherwise.

In other situations in which a consumer service provider 107A-107N offers the payment service, the service provider 101 provides a payment service user interface directly to a payor 103A-103N, via the communications network 106, that is branded as belonging to a consumer service provider 107A-107N. A consumer service provider is also known as a sponsor.

Also shown in FIG. 1 is one or more credit card issuers 108A-108N. A credit card issuer 108A-108N, such as a Visa® card issuer, a MasterCard® issuer, or a Discover® card issuer, communicates with the service provider 101 via the communications network 106. A credit card issuer 108A-108N could also be a consumer service provider 107A-107N, as will be described below. The service provider 101 is also in communication with one or more debit/credit card networks 109A-109N, such as, for example, the Visa® network, the MasterCard® network, and the Discover® network. Debit/credit card networks 109A-109N are utilized in processing some credit card based transactions in accordance with the present invention.

Also shown in FIG. 1 is one or more non-credit card accepting payees 113A-113N, each of which could be a managed payee or an unmanaged payee. A communication link 111 is shown between the non-credit card accepting payees 113A-113N and the service provider 101. If a non-credit card accepting payee 113A-113N is a managed payee, preferably the communication link 111 is an electronic link via network 106. If a non-credit card accepting payee 113A-113N is an unmanaged payee, the communication link 111 is a traditional physical delivery service, such as the United States Postal Service. It should be noted that a communication like 111 is not required between an unmanaged payee and the service provider 101 in all aspects of the present invention.

FIG. 1 also depicts one or more credit card accepting payees 110A-110N, each of which could be a managed payee or an unmanaged payee. A communication link 112 is shown between the credit card accepting payees 110A-110N and the service provider 101. Similar to above, if a credit card accepting payee 110A-110N is a managed payee, preferably the communication link 112 is an electronic link via network 106. If a credit card accepting payee 110A-110N is an unmanaged payee, the communication link 112 is a traditional physical delivery service.

Also shown in FIG. 1 is one or more payor financial institutions (payor FI) 115A-115N, a service provider financial institution (service provider FI) 116, and one or more payee financial institutions (payee FI) 117A-117N. Each payor FI 115A-115N maintains at least one DDA belonging to a payor 103A-103N. The service provider FI 116 maintains at least one DDA belonging to the service provider 101. Each payee FI 117A-117N maintains at least one DDA belonging to a payee, which could be a non-credit card accepting payee 113A-113N, or a credit card accepting payee 110A-110N. Each of the financial institutions depicted in FIG. 1, as well as each credit card issuer 108A-108N and the service provider 111 is in communication with a financial institution network (FI network) 118, which preferably is the ACH network, but could be any network capable of supporting electronic funds transfer.

Figure 2:
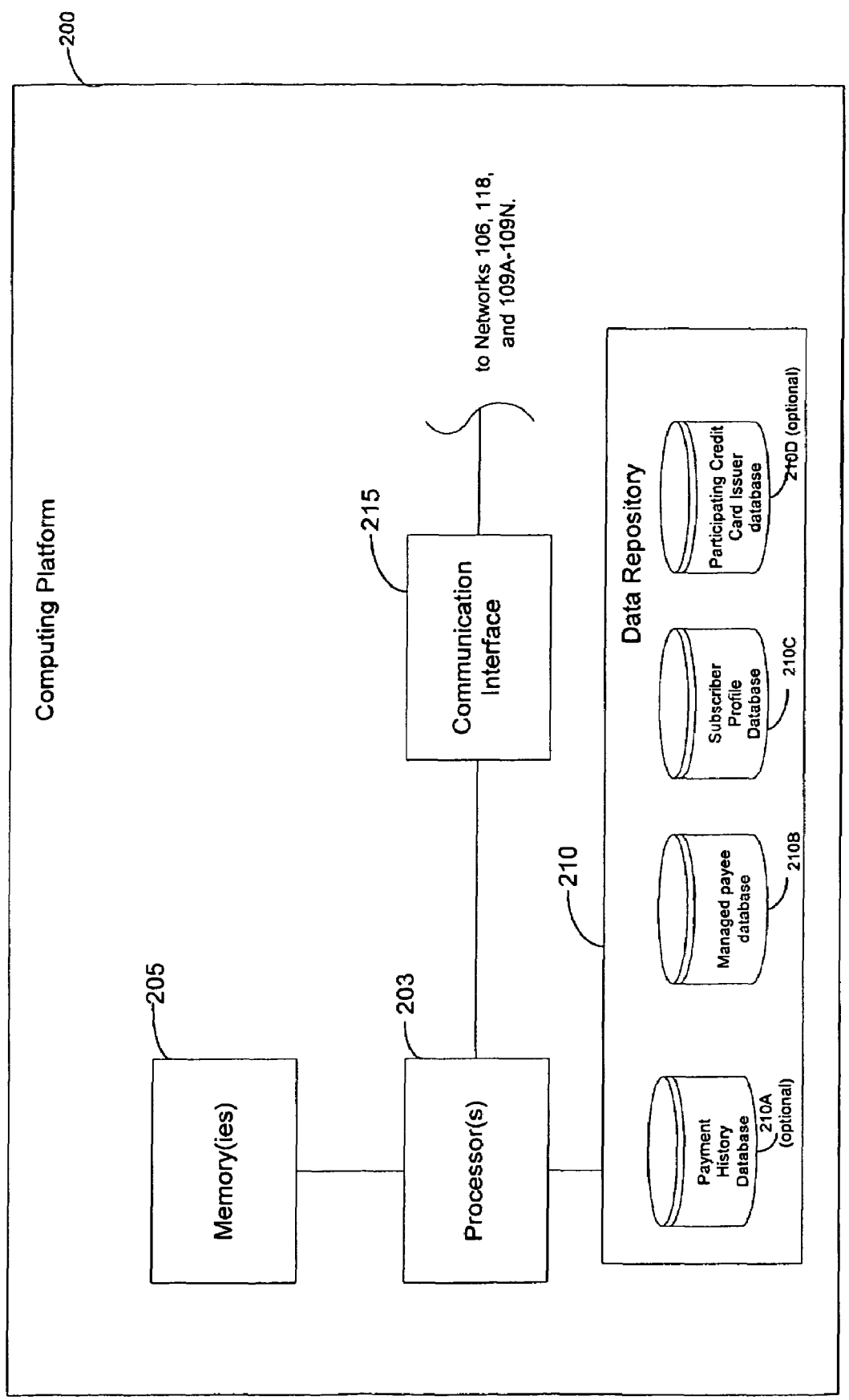
FIG. 2 is a simplified depiction of an exemplary computing system usable by a service provider providing an electronic payment service in accordance with the present invention.

The service provider 101 maintains a computing system to support the payment service of the present invention. The computing system includes one or more computing platforms, with one computing platform 200 being shown in FIG. 2, networked together. Each computing platform consists of one or more processors 203 configured to execute programming instructions stored in one or more memories 205. Each computing platform 200 also includes one or more communication interfaces 215 for transmitting and receiving data at via the communications network 106, via the FI network 118, and via the debit/credit card networks 109A-109N. As desired, a communication interface 215 also transmits and/or receives data via one or more other networks not depicted in FIG. 1. Additionally, the computing system includes a data repository 210, which may reside on the computing platforms 200 or be distributed on other, dedicated, database servers, or elsewhere on a computing network connecting computing platforms 200. FIG. 2 depicts data repository 210 residing on a computing platform 200. As necessary, a computing platform 200 has user (display/keyboard/mouse/voice/etc.) and other I/O (removable disk/tape/printer/etc.) interfaces, not shown in FIG. 2.

The data repository 210 beneficially includes, although does not require, an optional payment history database 210A that stores information associated with each payment completed by the service provider 101 on behalf of each payor 103A-103N. The data repository 210 also includes a managed payee database 210B that stores information associated with managed payees, including credit card accepting payees 110A-110N. The data repository 210 also includes a subscriber profile database 210C that stores information associated with those of payors 103A-103N that are subscribers. Also, the data repository 210 includes a participating credit card issuer database 210D that contains information associated with each participating credit card issuers 108A-108N. This information includes such information as information dictating how the service provider 101 is to communicate with an included credit card issuer 108A-108N and any rules an included credit card issuer 108A-108N might place on processing a payment request. As desired, other information can be stored in data repository 210, though not depicted in FIG. 2.

Through the electronic payment service provided by the service provider 101 a payor 103A-103N that is a customer of a participating credit card issuer 108A-108N can make credit card based payments to any payee, utilizing a credit card issued by a credit card issuer 108A-108N, including both non-credit card accepting payees 113A-113N and credit card accepting payees 110A-110N.

Introduced above, a payor 103A-103N can be a subscriber of the service provider 101, or a customer of a consumer service provider 107A-107N, which could be a credit card issuer 108A-108N, or a credit-card accepting payee 110A-110N, in addition to another entry. The subscriber in any case must be a customer of a participating credit card issuer 108A-108N to make a credit card based payment utilizing the present invention. If a payor 103A-103N is a subscriber, the subscriber profile database 210C stores information identifying and associated with that payor. If a payor 103A-103N is not a subscriber, information necessary for the service provider 101 to make a payment on behalf of that payor is included in each payment request.

For a subscriber, information identifying and associated with that subscriber is gathered during enrollment for that subscriber to access the services of the service provider 101. This information includes at least a subscriber's name and address information and payment account information. A payment account can, as desired by a subscriber, be a DDA, or a credit card account. Further, a subscriber can, as desired, have multiple payment accounts with the service provider 101. If a payment account is a DDA, the stored information includes a routing transit number of the payor FI 115A-115N at which the account is maintained and the account number of the DDA. Preferably, if a payment account is a credit card account, information necessary to place a charge on the credit card is stored in the subscriber profile database 210C. This includes the credit card number, expiration date, and billing address. Alternatively, as desired, the service provider 101 does not store such credit card information. Rather, in this alternative, the service provider 101 gathers credit card information each time a subscriber requests the service provider 101 to make a credit card based payment on behalf of the subscriber.

Figure 3A:
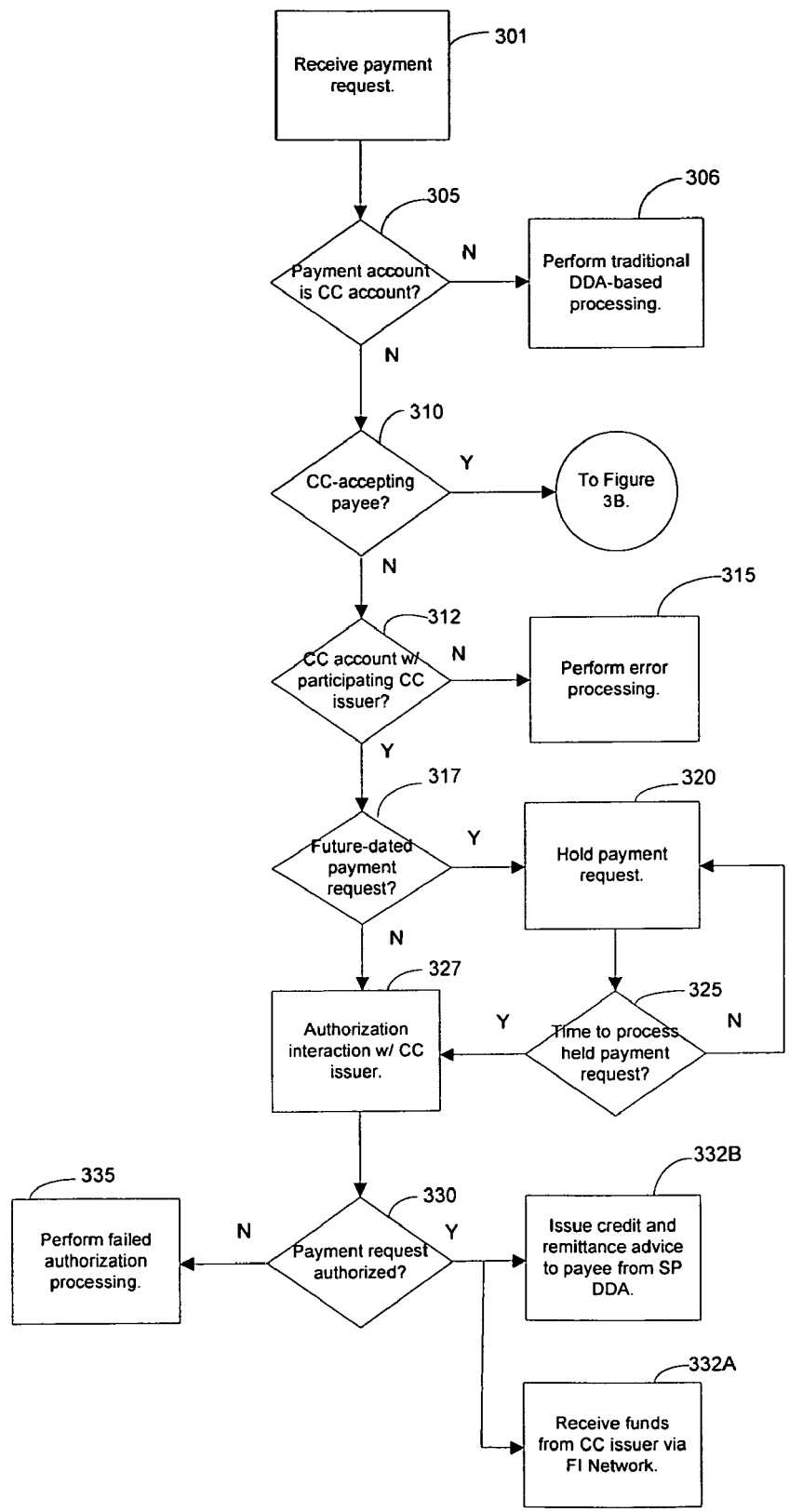
FIG. 3A is a flow chart depicting exemplary operations performed in providing the electronic payment service in accordance with certain aspects of the present invention.
Figure 3B:
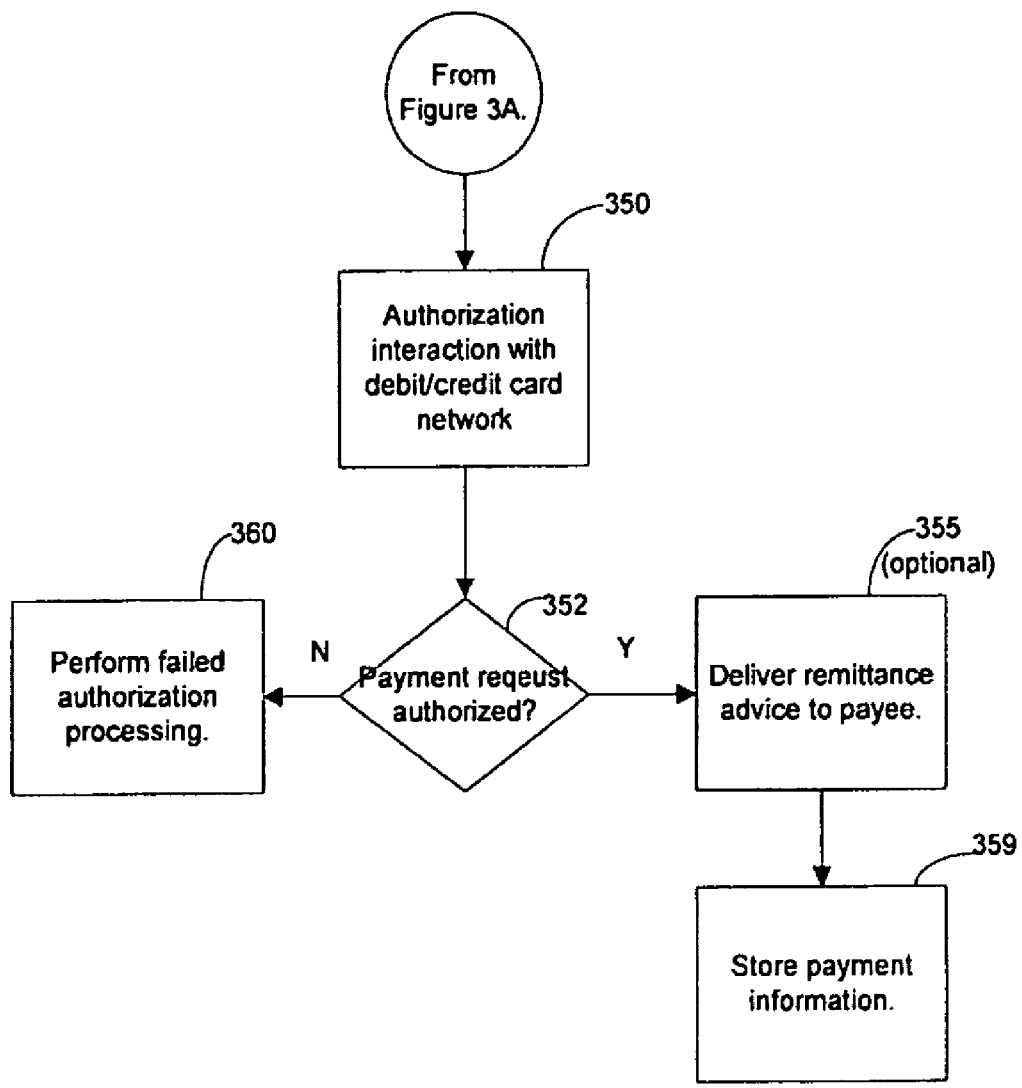
FIG. 3B is another flow chart depicting other exemplary operations performed in providing the electronic payment service in accordance with other aspects of the present invention.

FIGS. 3A and 3B depict exemplary operations of the service provider 101 in completing a payment on behalf of a payor 103A-103N. At step 301 a payment request is received by a service provider communication interface 215, from the communications network 106, and is passed on to a service provider processor 203. The payment request can be received directly from a payor 103A-103N, or a consumer service provider 107A-107N. The service provider processor 203 then processes the received request to complete payment to a payee on behalf of a payor 103A-103N. The processing of a payment request could be immediately subsequent to receipt, perhaps even while a payor 103A-103N is in session with the service provider 101, or at any time thereafter, such as in a periodic batch process.

The received payment request includes at least information identifying a payor 103A-103N, which could be a subscriber, or a non-subscriber, information identifying a payee, which could be a non-credit card accepting payee 113A-113N, or a credit card accepting payee 110A-110N, and information identifying a payment amount. Preferably, the payment request also includes information identifying a payment account (this could be implicit in the identification of the payor) and information identifying a payment date (this too could be implicit, with the absence of an explicit date indicating an "earliest available" payment date).

If the payor 103A-103N identified in the received payment request is not a subscriber, the payment request identifies a payor 103A-103N that is either associated with a consumer service provider 107A-107N, or is a not-yet-enrolled subscriber. If the identified payor is a not-yet-enrolled subscriber, the payment request is preferably held for processing until the not-yet-enrolled subscriber becomes fully enrolled.

Introduced above, a consumer service provider could be a credit card issuer 108A-108N, a credit card accepting payee 110A-110N, a non-credit card accepting payee 113A-113N, or another entity which makes the electronic payment service of the service provider 101 available to a payor 103A-103N, such as, for example, a payor financial institution 115A-115N, or Web portal. If the identified payor 103A-103N is a non-subscriber that is associated with a consumer service provider 107A-107N that is a participating credit card issuer 108A-108N, and if the identified payee is an entity different than the consumer service provider 107A-107N with which the payor 103A-103N is associated, in one aspect of the present invention the payment account identified in the payment request is preferably a credit card issued by that participating credit card issuer 108A-108N. The payee identified in the payment request can be either a non-credit card accepting payee 113A-113N, or a credit card accepting payee 110A-110N. That is, the payee can be any payee. Alternatively, as desired, the credit card issuer 108A-108N with which the identified payor is associated could limit the payees available for payment by its customers.

If the identified payor 103A-103N is a non-subscriber that is associated with a consumer service provider 107A-107N that is a credit card accepting payee 110A-110N, the payment account identified in the payment request is preferably, in one aspect of the present invention, a credit card that the payee accepts. However, as desired by that payee, the payment account could be one of a demand deposit account and/or a credit card of a participating credit card issuer 108A-108N that the payee does not accept. The payee identified in the received payment request, in this one aspect of the present invention, is the consumer service provider 107A-107N with which the identified payor is associated.

If the identified payor 103A-103N is a non-subscriber that is associated with a consumer service provider 107A-107N that is a non-credit card accepting payee 113A-113N, the payment account identified in the payment request is preferably a credit card of a participating credit card issuer 108A-108N. However, as desired by that payee, the identified payment account could be a DDA of the payor. Additionally, as desired by that payee, the payor could be given a choice of making payment utilizing a DDA or a credit card of a participating credit card issuer 108A-108N. The payee identified in the received payment request, in this aspect of the present invention, is the non-credit card accepting payee 113A-113N with which the identified payor is associated.

If the identified payor 103A-103N is a non-subscriber that is associated with another type consumer service provider 107A-107N, such as a payor financial institution 115A-115N or Web portal, the payment account identified in the payment request is preferably a credit card of a participating credit card issuer 108A-108N. However, as desired by a CSP 107A-107N, the identified payment account could be a DDA of the payor. Additionally, as desired by that CSP 107A-107N, the payor could be given a choice of making payment utilizing a DDA or a credit card of a participating credit card issuer 108A-108N. The payee identified in the received payment request could be, also as desired by that consumer service provider, any payee, or only a payee that consumer service provider has previously approved.

If the identified payor 103A-103N is a subscriber, the payment account identified in the payment request could be, as desired by the service provider 101, only a demand deposit account, only a credit card of a participating credit card issuer 108A-108N, or either demand deposit account or a credit card. The payee identified in the received payment request could be a credit card accepting payee 110A-110N, or a non-credit card accepting payee 113A-113N. That is, the payee identified in the received payment could be any payee. At step 305, during payment processing, the service provider processor 203 determines if the payment account is a credit card (CC) account based upon the contents of the received payment request. If not at step 306 the processor 203 performs traditional payment processing to fulfill the payment request.

If, however, at step 305 the processor 203 determines that the payment account is a credit card account, at step 310 the processor 203 determines if the payee identified in the received payment request is a credit card accepting payee 110A-110N that accepts the credit card identified in the received payment request. To make this determination, the processor 203 accesses the managed payee database 210B and determines if the payee of the payment request is included therein, and if so, if that payee accepts the identified credit card. If the payee is a credit card accepting payee that accepts the identified credit card, the operations depicted in FIG. 3B are executed. FIG. 3B will be discussed further below. Information identifying a payee, as well as credit cards that payee accepts, in the credit card accepting payees database 210B can be received from the payee or from a credit card issuer 108A-108N.

At step 312, if the payee is a non-credit card accepting payee 113A-113N, or if the payee is a credit card accepting payee 110A-110N that does not accept the identified credit card, the service provider processor 203 determines if the credit card identified in the received payment request is a credit card issued by a participating credit card issuer 108A-108N. This determination is made utilizing the participating credit card issuer database 210D. If the credit card is not issued by a participating credit card issuer 108A-108N, the service provider 101 cannot complete the payment. At step 315 error processing is invoked. This includes generating an error message which notifies the entity from which the payment request was received that the payment cannot be completed. The processor 203 causes a communication interface 215 to transmit the generated error message via the communications network 106. Optionally, as desired, the error message can include a prompt as to forms of payment that can be accepted, such as a DDA, or the types of credit cards that can be processed. The notification could be an in-session transmission or a batch transmission.

If a participating credit card issuer 108A-108N issues the credit card identified in the received payment request, operations continue with step 317 in which the processor 203 determines if the received payment request is a future-dated payment request. If so, the payment request is stored in a data repository 210 at step 320. If the received payment request is not a future-dated payment request, operations continue with step 327. Periodically, stored payment requests are evaluated to determine readiness for payment processing, set 325. If, during a periodic evaluation, it is determined that it is time to process a stored payment request, operations continue with step 327.

At step 327 the service provider processor 203 generates an authorization request. The authorization request includes information identifying the credit card account, information identifying the payment amount, and preferably information identifying the payee. The service provider processor 203 causes a communications interface 215 to transmit the generated authorization request to the credit card issuer 108A-108N of the credit card identified in the received payment request via the network 106. The credit card issuer 108A-108N returns an 'authorized' or 'declined' response via the communications network 106.

At step 330, a determination is made as to whether the payment request is authorized. If the transaction is declined, operations continue with step 335 in which the processor 203 generates a declined transaction message in which the service provider 101 notifies the entity from which the payment request is received that the transaction has been declined. The processor causes a communications interface 215 to transmit the generated declined transaction message via the communications network 106. Of course, this notification can, as desired, include an invitation to make the payment via another method, such as from a DDA, or another credit card. And, as above, this could be, as desired, an in-session transmission, or a batch transmission.

If an 'authorized' response is received, operations continue with steps 332A and 332B. In step 332A the service provider Fl 116 receives funds, via the Fl network 108, from the credit card issuer 108A-108N. These funds are deposited into a service provider account maintained at the service provider Fl 116. The credit card issuer 108A-108N includes in the payor's 103A-103N next statement an indication of the payment. This information associated with the payment reflected in the next statement beneficially includes information identifying the payee identified in the payment request, not the service provider 101.

At some point, either prior to, subsequent to, or essentially concurrent with the operations of step 332A, at step 332B the service provider processor 203 issues remittance to the payee, preferably according to one of the five methods discussed above. If the payee is an electronic managed payee and remittance processing (including optional account scheming) is successful, this is accomplished by the service provider processor 203 generating an ACH or third party electronic funds transfer file that includes a credit request in favor of the payee, in the amount of the payment, and remittance advice associated with the payment that may either be included in or associated with the ACH or third party electronic funds transfer file, or sent separately via a "Direct Send" interface. If the payee is not an electronic managed payee (or possibly if optional account scheming fails), this is accomplished by the service provider processor 203 generating a corporate check in favor of the payee, in the amount of the payment, with remittance advice either printed on the check, or associated therewith. Also, information associated with the completed payment, including payor, payee, amount, date, and payment method, is preferably stored in the optional payment history database 210A, if included in the computing system.

FIG. 3B depicts processing for those instances in which a payee is a credit card-accepting payee 110A-110N and the credit card identified in the received payment request is a credit card that payee accepts. At step 350 the service provider processor 203 generates an authorization request and causes a communications interface 215 to transmit the generated authorization request onto a debit/credit card network 109A-109N associated with the identified credit card, possibly through, as desired, a credit/debit card gateway service. The authorization request includes information identifying the payment account, information identifying the payment amount, and preferably information identifying the payee.

An accept or deny response is then received via the debit/credit card network 109A-109N responsive to the transmitted authorization request. At step 352 the processor 203 determines if the transaction has been accepted. If so, the processor 203 optionally causes remittance advice associated with the payment to be delivered to the payee, step 355. This could be an electronic transmission or a hard copy delivery. The processor 203 preferably causes information associated with the payment to be stored in the optional payment history database 210A, step 359, if included in the computing system.

If the transmission has been declined, operations continue with step 360 in which the service provider processor 203 generates and causes a declined transaction message to be transmitted as described above. Note that upon an approval, the service provider simply hands off the credit card transaction to the appropriate debit/credit card network, 109A-109N associated with the payor's credit card, and takes no further part in the movement of funds between the payor and payee. That is, the transaction is handled as though the payor had paid the payee directly, as in the biller-direct credit card model described above.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method comprising:
  receiving, by a payment service provider, a request to pay a payee on behalf of a payor utilizing a credit card account with a credit card issuer;
  determining, by the payment service provider responsive to the request, whether that payee will accept a payment fulfilling the request via a charge to the credit card account of the payor;
  processing, by the payment service provider, the request via a credit card network if it is determined that the payee will accept the payment fulfilling the request via a charge to the credit card account of the payor; and processing, by the payment service provider, the request via other than the credit card network if it is determined that the payee will not accept the payment fulfilling the request via a charge to the credit card account of the payor, wherein processing the request via other than the credit card network comprises:

transmitting, to the credit card issuer via other than the credit card network, the account information identifying the credit card account of the payor and the payment information representing the payment fulfilling the request, wherein the credit card issuer includes a record of the payment to the payee in a credit card statement to the payor issued by the credit card issuer; and directing the payment fulfilling the request to the payee on behalf of the payor from a payment account other than the credit card account;

wherein all of the above steps are performed by one or more computers associated with the payment service provider.

2. The method of claim 1, wherein:

the payment information includes at least one of information identifying an amount of the request and information identifying the payee for inclusion in the credit card statement.

3. The method of claim 1, wherein the request is processed via other than the credit card network, and further comprising:

determining, by the payment service provider prior to transmitting the account and the payment information, that the received request is associated with the credit card account;

wherein the account information and the payment information is transmitted to the credit card issuer based on the determination that the received request is associated with the credit card account.

4. The method of claim 1, wherein the request is processed via other than the credit card network, and further comprising:

determining, by the payment service provider prior to transmitting the account and the payment information, that the credit card issuer is a participating credit card issuer of the payment service provider;

wherein the account and the payment information is transmitted to the credit card issuer based on the determination that the credit card issuer is a participating credit card issuer.

5. The method of claim 1, wherein the request is processed via other than the credit card network and further comprising:

receiving, by the payment service provider from the credit card issuer, funds corresponding to an amount of the payment fulfilling the request;

wherein the payment fulfilling the request is directed either (i) prior to, (ii) subsequent to, or (iii) essentially concurrently with the receipt of the funds from the credit card issuer.

6. The method of claim 1, wherein the request is processed via other than the credit card network, and further comprising:

determining, by the payment service provider, that the payment fulfilling the request is to be made by electronic funds transfer;

wherein, based on this determination, the payment fulfilling the request is directed by issuing (a) a directive to credit an amount of the payment to a deposit account of the payee by either (i) an Automated Clearing House (ACH) funds transfer file or (ii) a third party funds transfer file, and (b) a directive to deliver remittance advice associated with the payment to the payee either (i) in association with the utilized funds transfer file or (ii) independent of the utilized funds transfer file.

7. The method of claim 6, wherein:

the determination that the payment fulfilling the request is to be made by electronic funds transfer is based on at least one of (i) a determination that the payee is an electronic payee or (ii) successful account scheming.

8. The method of claim 1, wherein the request is processed via other than the credit card network, and further comprising:

determining, by the service provider, that the payment fulfilling the request is to be made by a paper instrument;

wherein, based on this determination, the payment fulfilling the request is directed by issuing (a) a directive to print a check drawn on a payment account of the payment service provider made payable to the payee, and (b) a directive to print remittance advice associated with the payment to the payee either (i) on the printed check or (ii) on other than the printed check.

9. The method of claim 8, wherein:

the determination that the payment fulfilling the request is to be made by a paper instrument is based on at least one of (i) a failure of the payment service provider to determine that the payee is an electronic payee or (ii) a failure of the payment service provider to perform a successful account scheming.

10. The method of claim 1, wherein the request is processed via other than the credit card network, and further comprising:

receiving, by the payment service provider from the credit card issuer in response to the transmitted account and payment information and via other than the credit card network, an authorization notification;

wherein the payment fulfilling the request to the payee is directed by the payment service provider, based on the received authorization notification.

11. A method comprising:

receiving, by a payment service provider, a request to pay a payee on behalf of a payor utilizing a credit card account with a credit card issuer;

determining, by the payment service provider responsive to the request, whether the payee will accept a payment fulfilling the request via a charge to the credit card account of the payor; and processing, by the payment service provider, the request via a credit card network if it is determined that the payee will accept the payment fulfilling the request via a charge to the credit card account of the payor; and processing, by the payment service provider, the request via other than the credit card network if it is determined that the payee will not accept the payment fulfilling the request via a charge to the credit card account of the payor, wherein processing the request via other than the credit card network comprises:

transmitting, to the credit card issuer via other than the credit card network, an account information identifying the credit card account of the payor and a payment information representing the payment fulfilling the request for inclusion in a credit card statement to the payor issued by the credit card issuer;

receiving, from the credit card issuer in response to the transmitted account information and payment information, a non-authorization notification; and transmitting, to an entity from which the request was received, the received non-authorization notification and a request for resubmission of the request to pay the payee using an alternative account of the payor for funding the payment;
wherein the alternative account is different than the credit card account;
wherein all of the above steps are performed by one or more computers associated with the payment service provider.

12. The method of claim 11, wherein:
the alternative account is one of (i) a demand deposit account or (ii) an alternative credit card account.

13. A system comprising:
a communications interface configured to receive a request for a payment service provider to pay a payee on behalf of a payor utilizing a credit card account with a credit card issuer; and
a processor in communication with the communications interface and configured to:
    determine, responsive to the received request, whether the payee will accept a payment fulfilling the request via a charge to the credit card account of the payor;
    process the request over a credit card network if it is determined that the payee will accept the payment fulfilling the request via a charge to the credit card account of the payor; and
    process the request via other than the credit card network if it is determined that the payee will not accept the payment fulfilling the request via a charge to the credit card account of the payor, wherein the processor is operable to process the request by:
        directing transmission, to the credit card issuer via other than the credit card network, of account information identifying the credit card account and payment information representing the payment fulfilling the payment request, wherein the credit card issuer includes a record of the payment to the payee in a credit card statement of the credit card issuer to the payor for the credit card account; and
        directing the payment fulfilling the request to the payee on behalf of the payor from a payment account other than the credit card account;
wherein the communications interface is further configured to transmit, via other than the credit card network, the account and the payment information to the credit card issuer, in accordance with the processor directive.

14. The system of claim 13, wherein:
the payment information representing the payment fulfilling the request includes at least one of information identifying an amount of the request and information identifying the payee for inclusion in the credit card account statement.

15. The system of claim 13, wherein:
the request is processed via other than the credit card network; and
the processor is further configured to determine, prior to directing transmission of the account and the payment information, that the received request of the payor is associated with the credit card account, and to direct transmission of the account and the payment information to the credit card issuer based on the determination that the received request is associated with the credit card account.

16. The system of claim 13, wherein:
the request is processed via other than the credit card network; and
the processor is further configured to determine, prior to transmitting the account and the payment information, that the credit card issuer is a participating credit card issuer of the payment service provider, and to direct transmission of the account and the payment information to the credit card issuer based on the determination that the credit card issuer is a participating credit card issuer of the payment service provider.

17. The system of claim 13, wherein:
the request is processed via other than the credit card network;
the communications interface is further configured to receive a notification that funds corresponding to an amount of the payment fulfilling the request have been paid by the credit card issuer to the payment service provider; and
the processor directs the payment fulfilling the request either (i) prior to, (ii) subsequent to, or (iii) essentially concurrently with the receipt of the notification.

18. The system of claim 13, wherein:
the request is processed via other than the credit card network; and
the processor is further configured to (i) determine that the payment fulfilling the request is to be made by electronic funds transfer, and (ii) direct the payment fulfilling the request, based on this determination, by issuing (a) a directive to credit an amount of the payment to a deposit account of the payee by either an Automated Clearing House (ACH) funds transfer file or a third party funds transfer file, and (b) a directive to deliver remittance advice associated with the payment to the payee either in association with the utilized funds transfer file or independent of the utilized funds transfer file.

19. The system of claim 13, wherein the request is processed via other than the credit card network, and further comprising:
a printer in communication with the processor;
wherein the processor (i) determines that the payment fulfilling the request is to be made by paper instrument, and (ii) directs, based on this information, the payment fulfilling the request by issuing (a) a directive to print a check made payable to the payee and drawn on a payment account of the payment service provider, and (b) a directive to print remittance advice associated with the payment to the payee either on the printed check or on other than the printed check; and
wherein the printer is configured to print the check in accordance with the processor directive.

20. The system of claim 13, wherein:
the request is processed via other than the credit card network;
the communications interface is further configured to receive from the credit card issuer in response to the transmitted account and payment information and via other than the credit card network, an authorization notification; and
the processor directs the payment fulfilling the request to the payee based on the received authorization notification.

21. A system comprising:
a communications interface configured to receive a request for a payment service provider to pay a payee on behalf of a payor utilizing a credit card account with a credit card issuer; and
a processor in communication with the communications interface and configured to:

determine, responsive to the received request, whether the payee will accept a payment fulfilling the request via a charge to the credit card account of the payor;

process the request over a credit card network if it is determined that the payee will accept the payment fulfilling the request via a charge to the credit card account of the payor; and process the request via other than the credit card network if it is determined that the payee will not accept the payment fulfilling the request via a charge to the credit card account of the payor, wherein the processor is operable to process the request by:

directing transmission, to the credit card issuer via other than the credit card network, of account information identifying the credit card account and payment information representing the payment fulfilling the request for inclusion in a credit card statement of the credit card issuer to the payor for the credit card account;

wherein the communications interface is further configured to (i) transmit the account information and payment information to the credit card issuer in accordance with the processor directive, and (ii) receive, from the credit card issuer in response to the transmitted account and payment information, a non-authorization notification;

wherein the processor is further configured to direct transmission of the received non-authorization notification to an entity from which the request was received and request a resubmission of the request to pay the payee using an alternative account of the payor for funding the payment; and wherein the communications interface is further configured to transmit the non-authorization notification and resubmission request in accordance with the processor directive.

22. The system of claim 21, wherein:

the alternative account is one of (i) a demand deposit account or (ii) an alternative credit card account.

* * * * *

UNITED STATES PATENT AND TRADEMARK OFFICE
CERTIFICATE OF CORRECTION

PATENT NO. : 7,644,036 B2  Page 1 of 1
APPLICATION NO. : 11/479393
DATED : January 5, 2010
INVENTOR(S) : McCoy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this

Sixteenth Day of November, 2010

David J. Kappos
*Director of the United States Patent and Trademark Office*